United States Patent [19]
Aleshin et al.

[11] Patent Number: 5,293,265
[45] Date of Patent: Mar. 8, 1994

[54] REAL TIME VARIABLE LASER BEAM SPINNER

[75] Inventors: Stephen Aleshin, Cincinnati; Lorne A. Weeter, Maineville, both of Ohio

[73] Assignee: General Electric Company, Cincinnati, Ohio

[21] Appl. No.: 933,650

[22] Filed: Aug. 24, 1992

[51] Int. Cl.$^5$ .............................................. G02B 26/08
[52] U.S. Cl. .................... 359/198; 359/200; 359/209; 359/212; 359/224; 359/225; 359/226
[58] Field of Search .............. 359/874, 876, 223, 224, 359/225, 226, 209–211, 196–201, 212, 214, 220, 875

[56] References Cited

U.S. PATENT DOCUMENTS

| | | | |
|---|---|---|---|
| 4,750,486 | 6/1988 | Butler et al. | 128/303.1 |
| 4,822,974 | 4/1989 | Leighton | 219/121.67 |
| 4,871,904 | 10/1989 | Metlitsky et al. | 359/212 |
| 4,910,378 | 3/1990 | Arai | 219/121.74 |

OTHER PUBLICATIONS

Pre-lens Scanner Boring Head Accucutter. Two pages (unnumbered) of spec. sheets of Laser Mechanism, Inc. Box 2064. Southfield, Mich. Date: Oct. 14, 1987.

Primary Examiner—Bruce Y. Arnold
Assistant Examiner—James Phan
Attorney, Agent, or Firm—Jerome C. Squillaro; Charles L. Moore, Jr.

[57] ABSTRACT

A real time variable laser beam spinner, wherein a manual or programmable actuator angularly displaces a mirror or optical flat during rotation in order to follow the instantaneous spin diameter requirements associated with a workpiece, whereby a variable effective spin diameter of the beam results without interrupting the work process.

15 Claims, 8 Drawing Sheets

REAL TIME VARIABLE LASER BEAM SPINNER

FIELD OF THE INVENTION

The present invention relates generally to laser beam spinners and, more particularly, it relates to a real time variable beam spinner.

BACKGROUND OF THE INVENTION

Linear beam oscillating devices have been known and used to scan a laser beam back and forth in order to widen the effective beam operating area. A normal scanning device is only effective only in one oscillating direction of motion since the scanner generates a line instead of a circular path.

Beam spinners have become also known and used to spin a laser beam in a circular path in order to increase the effective width of the beam in all directions. It should be understood by the experts in the field that under spinning the actual diameter of the beam remains the same, and only its effective diameter on the workpiece is increased by the applied spinning. The known beam spinners with one or double optical means, however, must be set to a predetermined spin diameter before the actual operation and, must remain at that diameter until the beam and the apparatus is turned off and set to a different spin diameter. This has the drawback of repeated interruption of the operation, such as welding, each time a wider effective beam is necessary for the workpiece.

OBJECTS AND SUMMARY OF THE INVENTION

It is, therefore, an object of the present invention to eliminate the above-noted drawbacks of the known laser beam spinner devices.

It is another object of the present invention to provide a variable laser beam spinner apparatus, wherein the spin diameter of the laser beam can be selectively and continuously varied.

It is still another object of the present invention to provide a variable laser beam spinner apparatus, wherein the spin diameter of the laser beam can be selectively and continuously varied either manually or through a CNC (computer controlled numerical control device) apparatus.

It is a further object of the present invention to provide a variable laser beam spinner apparatus, wherein the spin diameter of the laser beam can be selectively and continuously varied, as may be required by the seam of a welding process, either manually or through a CNC control apparatus in real time.

Accordingly, the present invention provides a variable laser beam spinner apparatus including means for selectively and continuously varying in real time the spin diameter of an incident laser beam in accordance with the effective beam diameter requirement in a working process.

The present invention in another aspect thereof provides a variable laser beam spinner apparatus including manual means for selectively and continuously varying in real time the spin diameter of an incident laser beam in accordance with the effective beam diameter requirement in a working process.

The present invention in still another aspect thereof provides a variable laser beam spinner apparatus including CNC control means for selectively and continuously varying in real time the spin diameter of an incident laser beam in accordance with the effective beam diameter requirement in a working process.

The present invention in a further aspect thereof provides a variable laser beam spinner apparatus including a single reflective optical means and a CNC control means for selectively and continuously varying in real time the spin diameter of an incident laser beam in accordance with the effective beam diameter requirement of the working process.

The present invention in a still further aspect thereof provides a variable laser beam spinner apparatus including a single transmissive optical means and a CNC control means for selectively and continuously varying in real time the spin diameter of an incident laser beam in accordance with the effective beam diameter requirement of the working process.

BRIEF DESCRIPTION OF THE DRAWINGS

The invention will become more readily apparent from the following description of preferred embodiments thereof, illustrated, by way of examples, in the accompanying drawings, in which:

FIG. 3c is a top view illustration of the embodiment of FIG. 3a.

DESCRIPTION OF THE PREFERRED EMBODIMENTS

Figure 1:
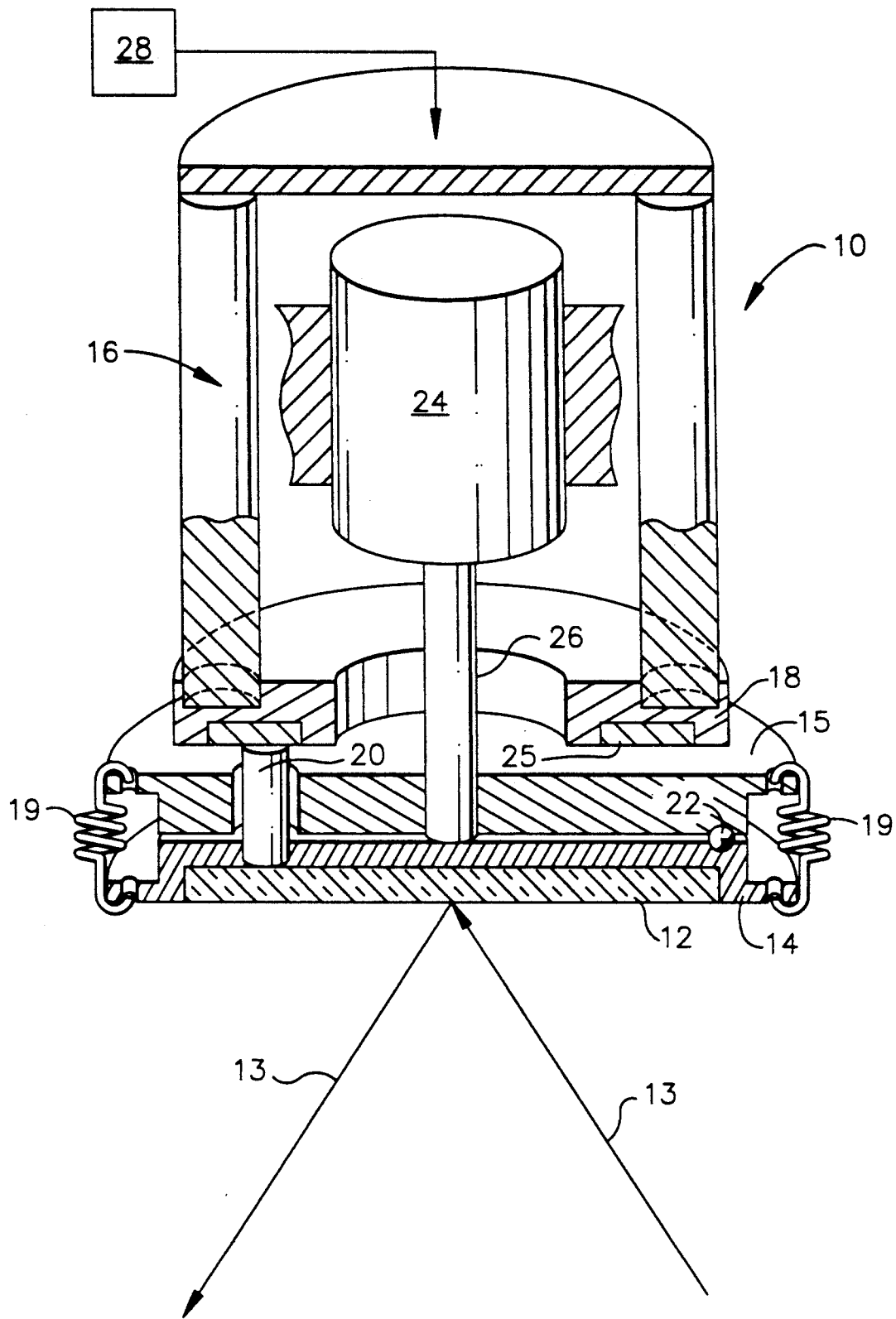
FIG. 1 illustrates the first embodiment of the beam spinner apparatus according to the present invention, in a sectional view and in a schematic fashion, in its rest or no-spin state.

With reference to the drawings, wherein like parts are identified by the same reference characters, it is seen FIG. 1 illustrates in section and in a schematic fashion the first embodiment of the real time variable laser beam spinner 10 according to the present invention, and in which, a reflective optical means, such as a mirror 12, onto which a laser beam 13 can be made incident as hereinafter described, is fixedly supported in a mirror holder 14 which is biased by tension springs 19 against a base plate 15. A mirror actuator 20 which is in the form of a pin shaft is fixed at the lower end thereof to the mirror holder but slidably passes in an opening formed through the base plate 15, while at the other end thereof is in operational contact with a pressure plate 18 for transmitting a downward force positioning or tilting the mirror at a predetermined angle with respect to its horizontal rest position shown in FIG. 1. The base plate 15 is fixed to a motor 24 by a motor shaft 26 for rotating the mirror 12, when energized, as hereinafter described.

In operation, a laser beam 13 incident onto the mirror 12 is desired to have its actual diameter be increased to a much larger effective diameter required by the operating process on a workpiece, such as a welding seam which can have various width configurations, it becomes necessary to cause a spinning of the beam 13. The principle of beam spinning has been known to increase the effective diameter of a beam. As mentioned above, each effective diameter required a separate and individual setting up of the beam spinning operation either by adjusting the angular position of a single mirror or by changing the respective alignments of a double-wedge type optics, which in turn, resulted in a stop-and-go-type process. The apparatus illustrated herein eliminates the above noted stop-and-go drawback of the known beam spinners by the provision of a pressure plate actuator 16 which can be either manually operated or controlled throughout the entire work process by a CNC control 28. The pressure plate actuator 16 being forced downward, exerts a downward pressure on the pressure plate 18 which is fixedly attached to a thrust bearing 25 which in turn is operationally coupled to the mirror actuator 20. The pressure plate 18 on the other hand, forces the mirror actuator 20 downward through the hole in the base plate 15 and, since it is fixedly connected to mirror holder 14, it will transmit a predetermined tilting action to the mirror 12 about a fulcrum 22. Since motor shaft 26 is fixedly connected to the base plate 15, the rotation of the base plate 15 will carry the actuator pin 20 with it, so that the mirror 12 will rotate while tilted having a low point fixed by the pin 20 and a high point fixed by the fulcrum 22. It follows from the above description of the spin, that the incident beam 13 is reflected by the mirror to generate a conical beam path which will increase the effective spin diameter which is then focussed at the desired point, such as a welding seam, on the workpiece. It also follows from the above-described spin operation, that the device does not have to stop during operation to change the desired spin diameter, irrespective whether the pressure plate actuator 16 is controlled manually or by CNC 28. The result is therefore, a real time selectively variable beam spinning following the requirements of a workpiece. It is also noted that the reflective-type optics or mirror 12 used in this embodiment enables the application of much higher energy laser beams compared to transmissive-type optics.

Turning now to the showing of FIGS. 2a-2e illustrating the second embodiment of the present invention, it is seen that within a spinner body 41 a pressure plate 42 forming a sliding arrangement with a pressure plate actuator 44 is arranged. A compression spring 46 forces the pressure plate actuator 44 to the right in FIG. 2a into a rest or no spin position of the apparatus. Tension springs 47 urge the pressure plate 42 against the pressure plate actuator 44. As can be seen in the figure, the actuator 44 is "sandwiched" between pressure plate 42 and the body 41. A thrust bearing 52 is fixedly held to the pressure plate 42. The shaft 26 of a motor 24 passes through the central opening in the plates 42, 44 and the thrust bearing 52 and is fixedly connected to a base plate 54 through which the mirror actuator pin 20 extends and is fixedly attached to the mirror holder 14 which fixedly holds the reflective-type mirror optics 12. Tensions springs 48 bias the mirror holder 14 against the base plate 54 and a single ball-like pivot bearing 50 arranged in the center portion of each the mirror holder 14 and of the base plate 54 will act as a fulcrum to bring about the tilting motion of the mirror when the actuator 20 is forced down, as hereinafter described.

Figure 2A:
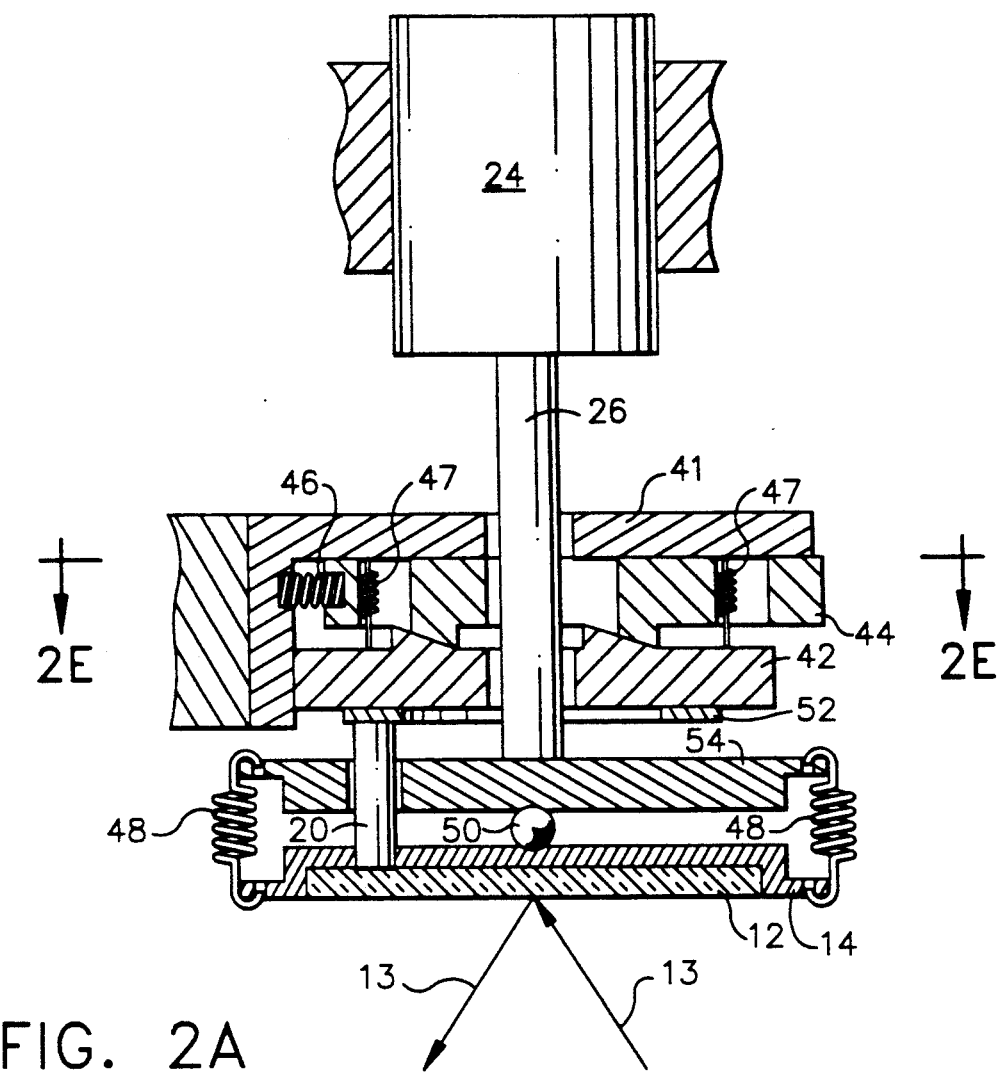
FIG. 2a is a schematic illustration in section, of a second embodiment of beam spinner apparatus according to the present invention in its rest position.
Figure 2B:
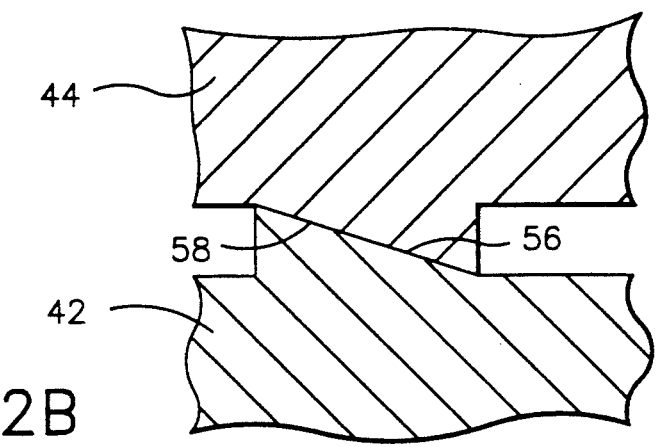
FIG. 2b is a schematic illustration of the tilting surfaces in FIG. 2a in their rest position.

Turning now to FIG. 2b representing schematically one of the pair of similar ramp like formation of the sliding surfaces between pressure plate 42 and the actuator plate 44, it is seen that a ramp surface 56 is formed on pressure plate 42 and a similar but opposite surface is formed on plate 44. FIG. 2b illustrates the plates 42, 44 in their rest position.

Figure 2C:
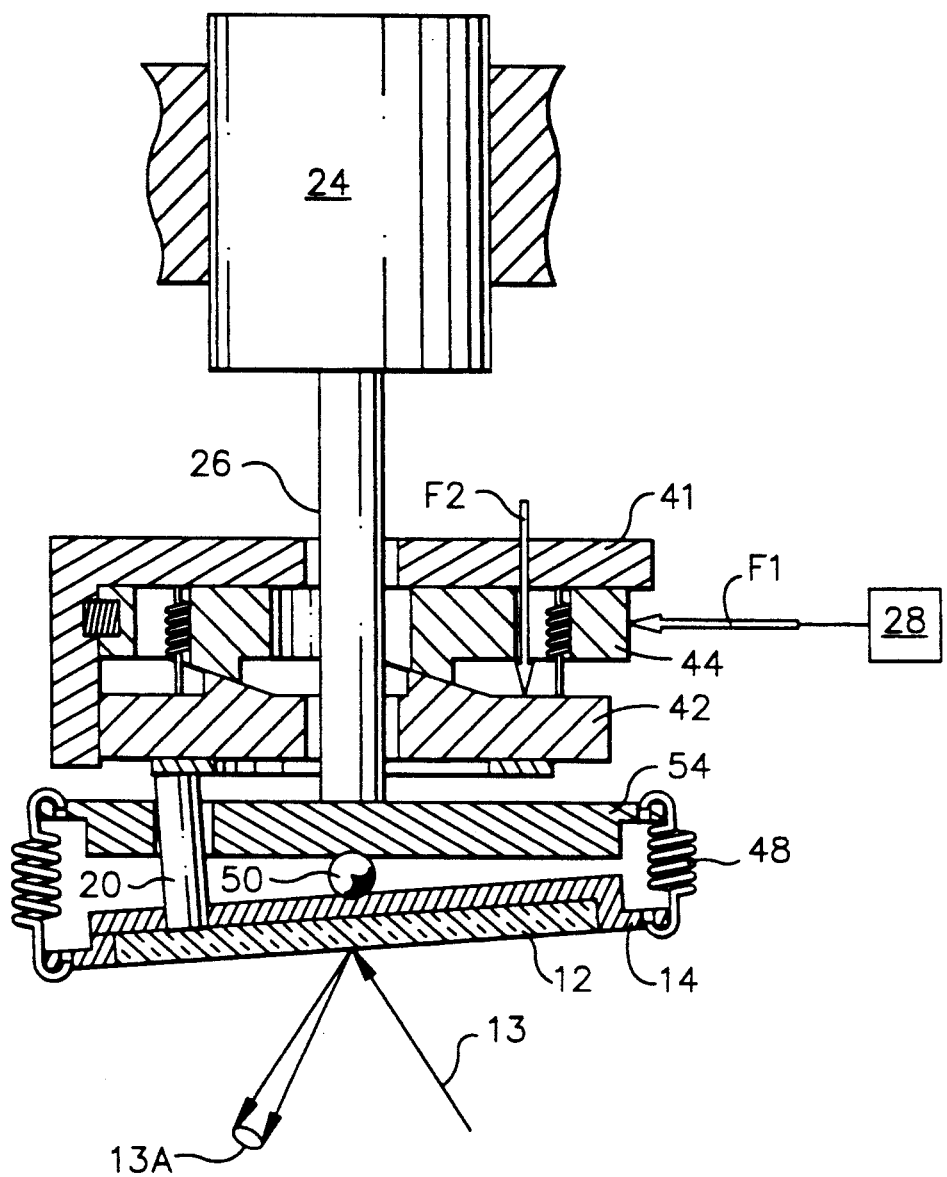
FIG. 2c is a schematic illustration in section of the embodiment of FIG. 2a in its spin position.
Figure 2D:
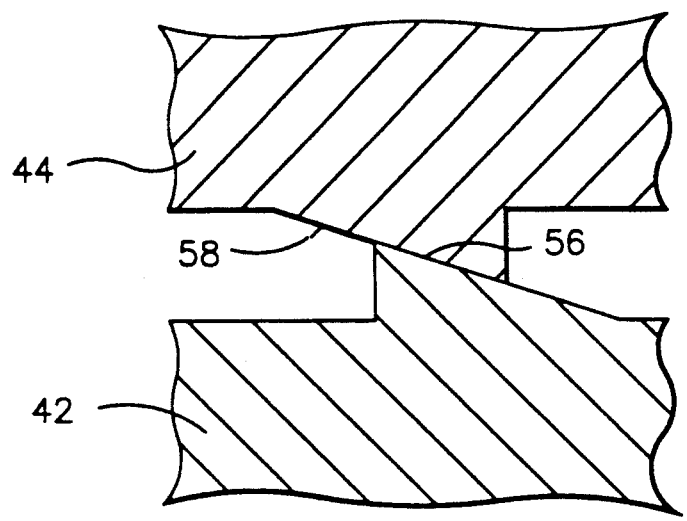
FIG. 2d is a schematic illustration of the tilting surfaces in FIG. 2c in their actuated or spin position.

The operation of the FIG. 2a device is illustrated in FIGS. 2c and 2d, wherein a controlled displacement force F1 developed manually or by the CNC control 28 is acting on the pressure plate actuator 44 in the direction of the arrow and displaces same to the left, as shown, against the action of the compression spring 46. As a result and due to the presence of the ramp surfaces 56, 58, the pressure plate actuator by sliding up on the ramp surfaces 56, 58, will force the pressure plate 42 downward along with thrust bearing 52, which action, in turn, will force the mirror actuator 20 downward through the opening in base plate 54 and, thereby forcing the mirror holder 14 with the mirror 12 fixed in it to a tilted position shown, about a centered pivot bearing 50 and against the force of a set of tension springs 48. The shaft 26 of motor 24 is fixed to base plate 54 will cause a rotation of the mirror holder 14 and of the mirror 12 and due to the angular displacement by the actuator 20, it will generate a rotary oscillatory motion which will impart a conical path to reflected beam 13a during rotation, similarly as described in connection with FIG. 1, and causing an increase in the effective diameter of an incident laser beam 13. Again, as discussed earlier, the action of the controlled displacement force F1 is variable during the spinning operation to follow the shape of a portion of the workpiece as the requirement may be or the program in the CNC control 28.

Figure 2E:
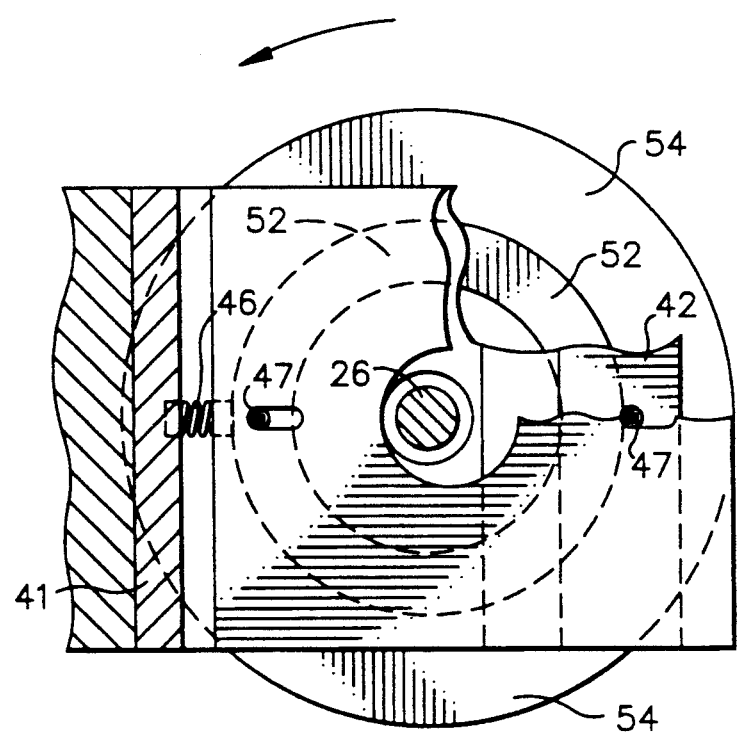
FIG. 2e is a schematic illustration, in section taken along line e—e in FIG. 2a and viewed in the direction of the arrow therein.

Turning now to FIG. 2e, it can be seen that the motor shaft 26 descends from the motor downward through the central passage provided in the pressure and actuator plates 42, 44 and in the thrust bearing 52 and is fixed to the base plate 54 causing the spinning rotation as shown by the arrow in FIG. 2e.

Figure 3A:
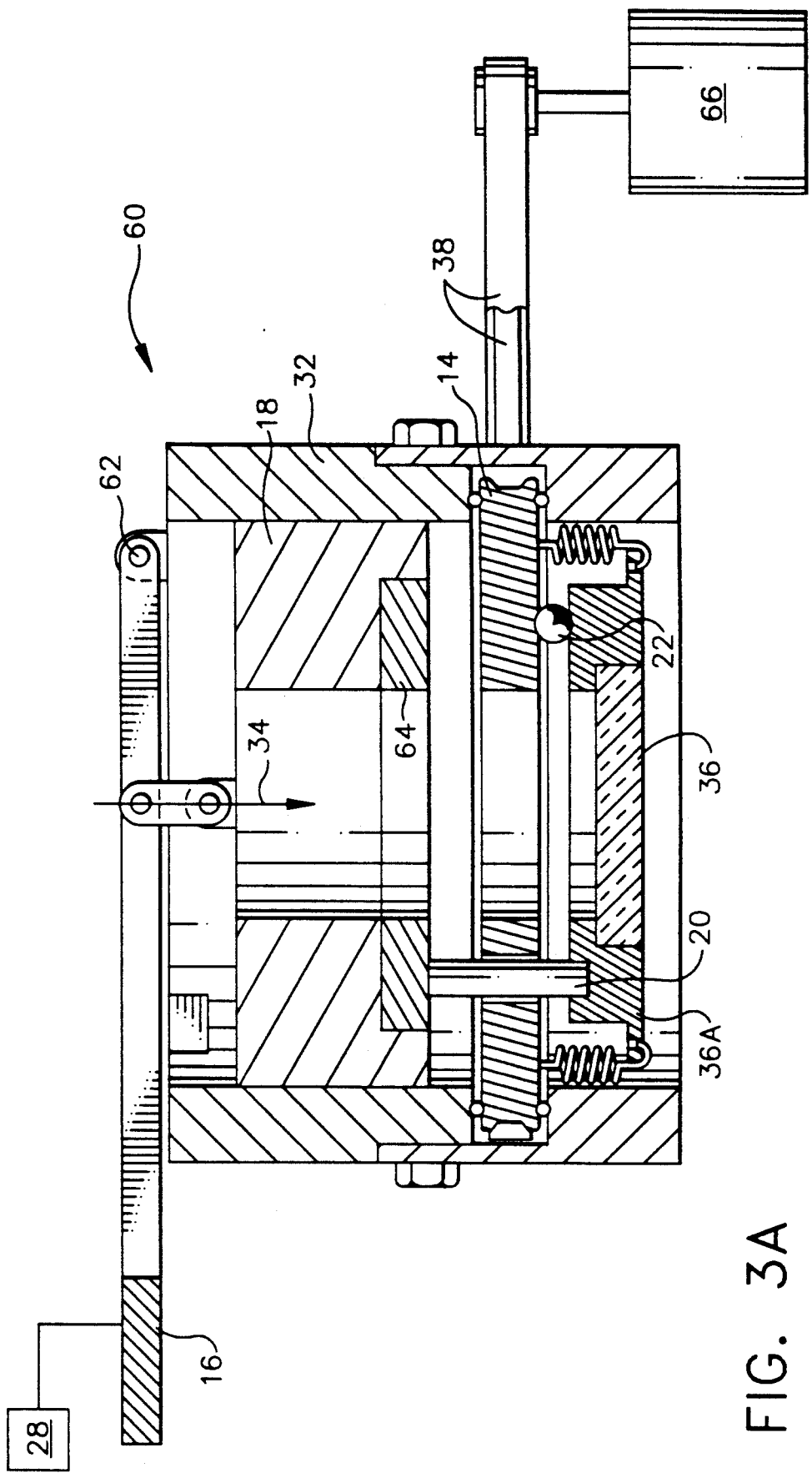
FIG. 3a is a schematic illustration, in section, of a third embodiment of the beam spinner apparatus according to the present invention in its rest or no-spin position.
Figure 3B:
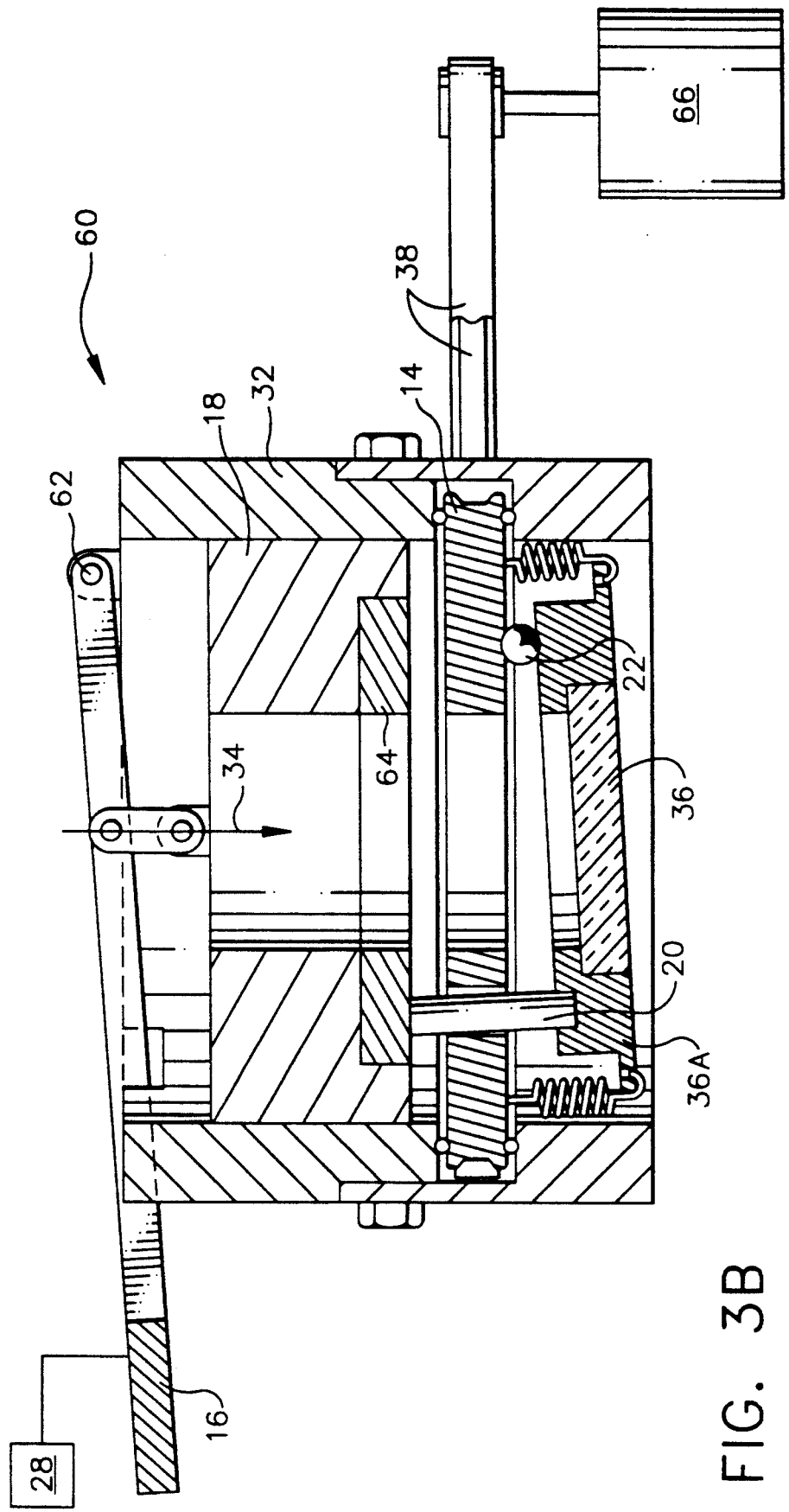
FIG. 3b is a similar illustration of the embodiment of FIG. 3a in its actuated or spin position.
Figure 3C:
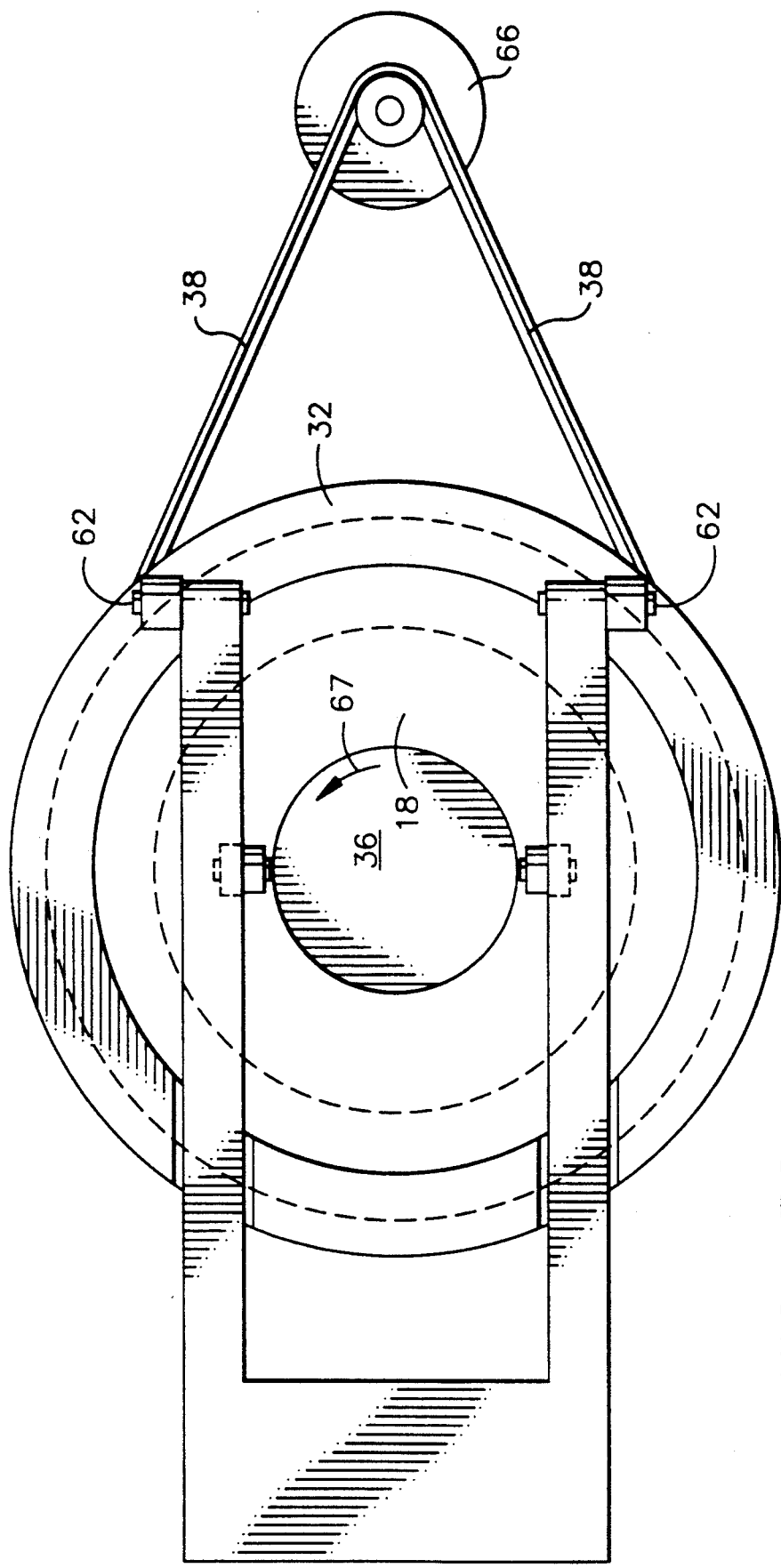

Turning now to FIGS. 3a-3c illustrating the third embodiment of the real time beam spinner 60 according to the present invention, it is noted that in this embodiment instead of a mirror, a laser transparent optical flat 36 is used. As can be seen in FIG. 3a, the pressure plate actuator 16 operated manually or by the CNC 28 is coupled by a hinge 62 to the beam tube 32 for rotational movement to exert a downward control displacement force, when actuated, on the pressure plate 18, which in turn, through the thrust bearing 64 forces the optic flat actuator 20 downward to impart a predetermined tilted position, about a pivot means 22, to the flat holder 36a and to the flat 36 fixed in the flat holder 36a, as shown in FIG. 3b. The rotational movement is applied to the flat through the base plate, 14 through which the actuator 20 extends by a driving belt 38 coupled to a drive motor 66. Again, as in the other embodiments, due to the biasing arrangement, the holder 36a and the flat 36 during rotation describe a rotating oscillatory motion with a low point determined by the extent of the actuator pin's downward displacement and with a high point determined by the fixed position of the pivot means 22. Therefore, an incident beam 13 will result in an increased effective spin diameter shown in FIG. 4b. Herein, also as in the other embodiments, the tilting of the flat 36 can be made continuously variable during the working process as need arises without discontinuing the operation.

FIG. 3c illustrates the third embodiment in top view showing the spinning by the arrow 67.

The optical flat 36, which is laser transparent, can be made from Zinc Selenium (ZnSe) or other material dependent upon the wavelength of the laser used, that is, its physical properties are selected according to the type of the laser used. In the illustrated exemplary embodiment a $CO_2$ laser is used.

Figure 4A:
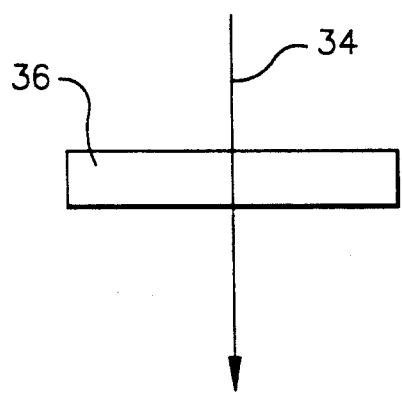
FIG. 4a is a schematic illustration of the beam path through the apparatus of FIG. 3a-3c in its rest position.
Figure 4B:
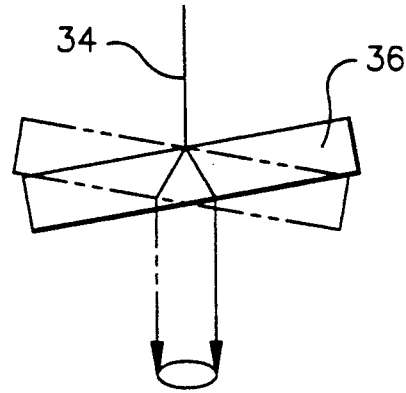
FIG. 4b is a schematic illustration of the beam path through the apparatus of FIG. 3a-3c during spinning.

The rest or no-spin position of the beam 34 in the spinning apparatus of FIGS. 3a-3c is illustrated in FIG. 4a, while the beam behavior during spinning is shown in FIG. 4b. As can be seen in FIG. 4b, the oscillatory movement of the flat 36 created by the rotary motion will result in an increase of the effective beam diameter as shown by the circular path therein.

While there has been described herein what is considered to be a preferred embodiment of the present invention, other modifications of the invention shall be apparent to those skilled in the art from the teaching herein and, it is, therefore, desired to be secured in the appended claims all such modifications as fall within the true spirit and scope of the invention.

Accordingly, what is desired to be secured by letters patent of the United States is the invention as defined and differentiated in the appended claims.

What is claimed is:

1. A real time variable laser beam spinning apparatus comprising;
   optical means adapted to deflect an incident laser beam when said optical means is tilted at a predetermined angle with respect to said incident beam;
   means occupied coupled to said optical means for imparting a rotational movement to said optical means about an axis non-parallel to a plane of said optical means; and
   means coupled to said optical means for applying a predetermined and variable tilted position to said optical means during rotation, said tilted position applying means including displaceable means coupled to said optical means; and
   control means coupled to said displaceable means for displacing said displaceable means for a predetermined tilted distance.

2. The apparatus as claimed in claim 1, wherein said displaceable means includes a pressure plate, an actuator means operationally coupled to said pressure plate, said pressure plate being operationally coupled to means mounting said optical means and for determining a lower limit of displacement of said optical means at said tilted position thereof, and pivot means at said tilted position thereof, and pivot means fixed in position for determining the upper limit of displacement of said optical means, whereby during rotation of said optical means a rotary oscillatory motion is generated resulting in an increased effective spin diameter of an incident beam.

3. The apparatus as claimed in claim 1, wherein said control means includes actuating means coupled to said displaceable means.

4. The apparatus as claimed in claim 1, wherein said control means comprises manually operable means.

5. The apparatus as claimed in claim 1, wherein said control means comprises programmable control means.

6. The apparatus as claimed in claim 1, wherein said optical means is a reflective mirror means.

7. The apparatus as claimed in claim 1, wherein said optical means is a laser transparent optical flat means.

8. The apparatus as claimed in claim 7, wherein said laser beam is a $CO_2$ laser beam and said optical flat means is made from Zinc Selenide (ZnSe).

9. The apparatus as claimed in claim 1, wherein said displaceable means includes pressure plate means, actuator means coupled to said pressure plate means, said pressure plate means being coupled to said optical means for displacing said optical means into said tilted position, when actuated, pressure plate actuator means operationally coupled to said pressure plate means and adapted to respond to a controlled displacement force input determining the extent of said tilted position.

10. The apparatus as claimed in claim 9, wherein said pressure plate means includes a ramp surface having a predetermined direction, said pressure plate actuator means having a ramp surface directed opposite the ramp surface of the pressure plate means, said ramp surfaces are arranged in sliding relationship with respect to each other, said controlled displacement force input when applied to said pressure plate actuator means forcing the ramp surface thereof to slide over the ramp surface of said pressure plate means and forcing said pressure plate means to be displaced to a predetermined distance and direction to cause said predetermined tilting position of said optical means.

11. The apparatus as claimed in claim 10, including means for biasing said pressure plate actuator means into a rest position in the absence of said controlled displacement force input.

12. The apparatus as claimed in claim 10, wherein displacement of said actuator means determines a lower limit of said tilted position, pivot means coupling said optical means to said pressure plate means for rotation about said pivot means and determining the upper limit of said displacement of the optical means, whereby during rotation a rotary oscillatory motion of said optical means is generated about said pivot means.

13. The apparatus as claimed in claim 9, wherein said optical means comprises a mirror.

14. A real time variable laser beam spinning apparatus, comprising:
   a reflector to reflect an incident laser beam;
   a base plate, said reflector being pivotally coupled to said base plate to position said reflector at a predetermined angle with respect to the incident laser beam;
   a motor with a drive shaft coupled to said base plate to rotate said reflector about an axis non-parallel to said reflector; and
   means for pivoting said reflector at the predetermined angle and for variably pivoting said reflector during rotation thereof.

15. A real time variable laser beam spinning apparatus, comprising:
   a beam tube for enclosing a laser beam;
   a laser transparent optical flat disposed in said beam tube to deflect the laser beam when said optical flat is tilted at a predetermined tilt angle with respect to the laser beam;
   means for rotating said optical flat about an axis non-parallel to a plane of said optical flat; and
   means for applying and varying said predetermined tilt angle during rotation of said optical flat to cause the laser beam to follow a substantially circular shaped path.

* * * * *